Feb. 6, 1940. W. A. BLACK ET AL 2,189,339
APPARATUS FOR USE IN WELDING
Filed Feb. 7, 1939
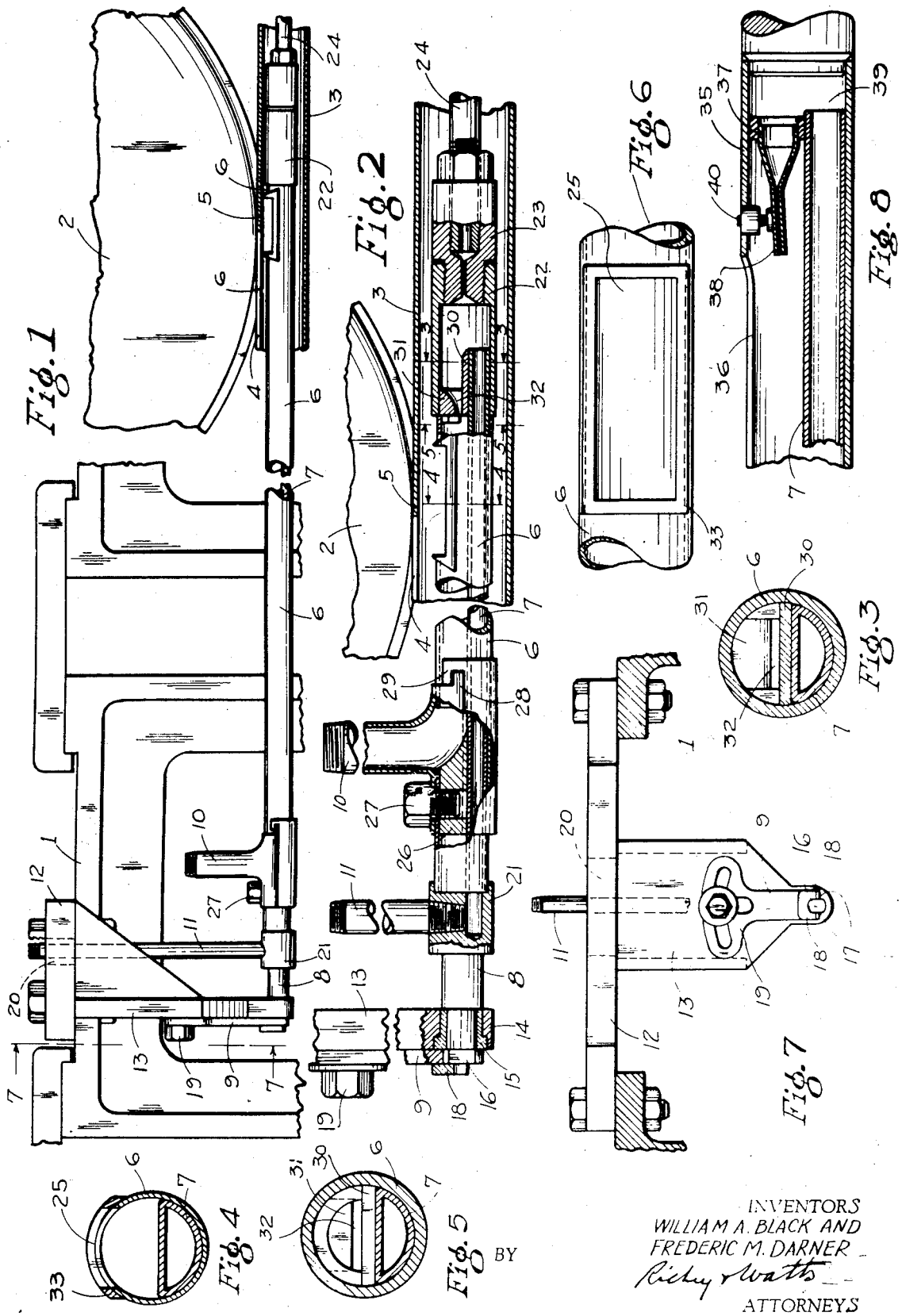
INVENTORS
WILLIAM A. BLACK AND
FREDERIC M. DARNER
Ricky & Watts
ATTORNEYS Patented Feb. 6, 1940

2,189,339

UNITED STATES PATENT OFFICE 2,189,339

APPARATUS FOR USE IN WELDING

William A. Black, Lake Lucerne, and Frederic M. Darner, Shaker Heights, Ohio, assignors, by mesne assignments, to Republic Steel Corporation, Cleveland, Ohio, a corporation of New Jersey Application February 7, 1939, Serial No. 255,090

5 Claims. (Cl. 219—6)

This invention relates to the art of making longitudinally welded, tubular metal articles, such as tubing and pipe, and is particularly concerned with new and improved apparatus for collecting and congealing particles of molten metal which pass into the interior of the tubular article while it is being welded, and for removing such particles from the interior of the article.

In the electric welding of longitudinal seams in tubular articles, particles of molten metal are formed in the vicinity where welding takes place. Some of these particles, probably in the form of globules, pass into the interior of the article being welded at a considerable velocity and impinge against the inner surface of the article and adhere more or less tenaciously thereto. When the interior of the article is planished subsequent to the welding operation, some of these adhering particles of metal may be rolled into the surface. For many services the welded pipe or tubing should have very smooth inner surfaces and such surfaces are obtained with difficulty when the particles of molten metal have adhered thereto or have impinged thereagainst with sufficient force to pit those surfaces. When such adhering particles are forcibly removed, they often pull away some of the metal of the article, thereby forming pits or depressions. It is not always possible to remove all such adhering particles, in which case projections will be left on the inner surface of the article.

The present invention aims to prevent the particles of molten metal formed during welding from contacting the inner surfaces of the tubular article being welded and to collect such of those particles as enter the article and remove them from the interior of the pipe or tubing as rapidly as they are collected.

In the drawing accompanying and forming a part of this specification and in which is illustrated one form of apparatus embodying the invention and satisfactory for carrying out the process of the invention:

Figure 1 is a fragmentary, side elevational view, partly in section, showing a device embodying the present invention in combination with parts of a continuous, electric resistance, welding machine;

Figure 2 is an enlarged, fragmentary, partly sectional, side elevational view of the particle collecting and removing device of Fig. 1;

Figures 3, 4 and 5 are transverse sectional views taken on lines 3—3, 4—4 and 5—5 of Fig. 2;

Figure 6 is a fragmentary, top plan view taken on line 6—6 of Fig. 1;

Figure 7 is a transverse, fragmentary, end elevational view, partly in section, taken on line 7—7 of Fig. 1; and, Figure 8 is a fragmentary, partly sectional view of a modified form of fluid directing means.

In Figure 1, I designates part of a tube-forming portion of a continuous electric resistance welding machine, 2 designates one of the rotary electrodes of the welding portion of such a machine, and 3 designates a tube formed in the forming portion of the machine with an open seam gap 4 which is closed by welding at electrodes 2 to form the weld indicated at 5. Such a welding machine is shown more in detail in U. S. Patent No. 1,388,434.

The device for collecting and removing particles of molten metal which are formed when the weld 5 is made and which pass into the interior of tube 3, comprises inlet and outlet tubes connected together to form a reversed or U-shaped path of travel for liquid, an inlet connection from a source of liquid under pressure to the inlet tube, and an outlet connection from the outlet tube adjacent to said inlet connection, and means in the outlet tube to direct a stream of liquid beneath a particle-receiving opening in the tube to carry particles of metal formed during welding to the outlet connection.

The particle-removing device illustrated herein comprises an outer tube 6, an inner tube 7, securing members 8 and 9 and fluid connections 10 and 11. A cross bar 12 connected to upright parts of the forming portion 1 of the welding machine has a depending bracket 13 provided at its lower extremity with an aperture having an annular internal shoulder 14. A bearing 15 is seated in the aperture and has an external annular shoulder to seat against shoulder 14. The member 8 is in the form of a rod which has a cylindrical portion passing thru bearing 15 and having a headed end 16 to bear against the end of the bearing. Head 16 has flattened sides 17, as is better shown in Fig. 7, which are engaged by the opposed fingers 18 of a yoke 9 which is attached, as by cap screw 19, to bracket 13. The cross bar 12 has a slot 20 therein thru which extends connection 11, presently to be described. It will be understood that the upper end of yoke 9 may be shifted with respect to a vertical plane passing thru cap screw 19 and in this manner the rod 8 may be rotated, the slot 20 permitting corresponding movement of connection 11. It will be understood that the head 16 of rod 8 and the yoke 9 permit maintenance of the rod 8 and the parts attached thereto in predetermined positions while permitting circumferential adjustment thereof.

Rod 8 has an enlarged end 21 thru which an opening extends. Connection 11, in the form of a tube, is secured in one end of that opening. The tube 6 is secured in any suitable manner, as by welding, to end 21, and one end of the flat topped tube 7 is seated against end 21 at the other end of the opening thru end 21, so that liquid flowing in connection 11 will pass thru end 21 and into tube 7.

Tube 6 has a substantially closed end 22 which, as shown, is provided with a plug 23 which may be connected to a planishing rod 24. The tube 6 is provided with an opening 25 in its top portion which opening is considerably wider than the seam 4 which is being welded, is long enough to extend from a point an inch or so in front of the place of welding to a point an inch or so therebeyond, and is positioned below electrodes 2 within tube 3 so as to insure that all particles of molten metal which are formed during welding and which pass into tube 3 will pass thru opening 25 into outer tube 6. A plug 26 bears against the top of inner tube 7 and, together with tube 7, substantially fills tube 6 near the end 21 of rod 8. An outlet from tube 6 communicates with tube 10, the tube 10 being secured in place by cap screw 27 and ears 28 on tube 10 which interlock with corresponding ears 29 secured, as for example by welding, to the exterior of tube 6.

The end tube 22 of tube 6 is provided with a cross wall which may be composed in part of tube 7 and in part of a plate 30 resting on inner tube 7 and member 31 which leaves a small aperture 32 between it and plate 30. This cross wall, in part, defines a chamber in the end 22 into which liquid flowing thru tubes 11 and 7 may discharge. Such liquid may escape from that chamber by passing thru aperture 32 and it may so escape at considerable velocity because of pressure of the liquid.

As is shown more clearly in Figs. 4 and 6, the opening 25 in tube 6 is surrounded by an upwardly extending ledge 33, one purpose of which is to insure that all particles of molten metal which pass into the interior of tube 3 will also pass thru opening 25. This ledge may be built up by brazing, if desired.

The above-described apparatus operates substantially as follows: When the apparatus is assembled as shown in the drawing, and when a source of fluid under pressure is connected to tube 11, and the seam gap 4 of tube 3 is being welded, particles of molten metal which are formed during welding and which pass thru opening 25 and into tube 6 will contact with liquid which had passed thru aperture 32 at a considerable velocity and is flowing on the flat top of tube 7 to tube 10. These particles will be congealed by such liquid and will be carried with the swiftly moving fluid out thru tube 10. Since substantially no particles of molten metal can come into contact with the inner surface of tube 3, that surface will not be damaged, nor will any particles adhere to it and require subsequent removal.

It will be understood that a suction device, such as a centrifugal pump or an injector, may be connected to outlet connection 10, if desired, to expedite the flow of liquid and particles out of the device.

It will also be understood that while the illustrated device comprises outer and inner tubes, the tubes need not be so arranged but may be located side by side and neither, within the other when the pipe or tube being welded is sufficiently large in diameter to accommodate them. In such case the tube thru which the liquid enters would empty, at its discharge end, into the inlet end of the other pipe.

It will also be understood that the ledge 33 may be omitted if desired.

In Fig. 8 is shown a modification of parts of the device of Fig. 2. The outer tube 35 is quite like tube 6 but the opening 36 has no ledge about it. A tube 37 with a flattened end 38 serves to discharge a flat stream of liquid from the chamber 39 beneath opening 36. A stud 40 serves to press downwardly the end 38 of tube 37 and regulates the angularity of flow of the liquid under opening 36. The natural spring of the bent tube 37 serves to press the tube upwardly against stud 40.

Having thus described the present invention so that those skilled in the art may be able to understand and practice the same, we state that what we desire to secure by Letters Patent is defined in what is claimed.

What is claimed is:

1. Apparatus of the class described comprising an outer tube insertable within a tubular article to be welded and having a substantially closed end and a top opening thru its upper portion near said end, an inner tube in the lower portion of said outer tube, a cross wall, including said inner tube, disposed in said outer tube between said closed end and said top opening and having a restricted passage therethru, means for connecting a source of liquid under pressure to the interior of said inner tube, means for connecting the interior of said outer tube remote from said top opening and also remote from said closed end of the outer tube to a source of suction, and means cooperating with said outer tube to maintain the apparatus in predetermined position in a tubular article being welded.

2. Apparatus of the class described comprising an outer tube insertable in a tubular article to be welded and having a substantially closed end and a top opening thru its upper portion near said end, a flat topped tube substantially filling the lower portion of said outer tube and extending beneath said top opening and having an outlet between said top opening and said closed end, a cross wall in said outer tube disposed between said top opening and said outlet of the inner tube and having a restricted passage therethru, means connecting a source of liquid under pressure to the interior of said inner tube, means connecting the interior of said outer tube remote from said top opening and from the closed end of the outer tube to a source of suction, and means cooperating with said outer tube to maintain it in predetermined position in a tubular article being welded.

3. Apparatus of the class described comprising an outer tube insertable within a tubular article to be welded and having a substantially closed end, an outlet near the opposite end and a top opening between said ends, an inner tube in the lower portion of said outer tube and having an inlet near the said outlet and a discharge end between said top opening and said closed end of the outer tube, a cross wall in the outer tube disposed between the discharge end of the inner tube and the top opening of the outer tube and having a restricted passage therethru, means for connecting a source of liquid under pressure to the interior of said inner tube, and means cooperating with said outer tube to maintain it in predetermined position in a tubular article being welded.

4. Apparatus of the class described comprising telescoped inner and outer tubes having adjacent inlet and outlet connections respectively, the outer tube having a closed end remote from its outlet connection, the interior of the inner tube communicating with the interior of the outer tube near the closed end of the latter, the outer tube having a top opening between its ends, a cross wall in said outer tube between the said top opening and the discharge end of said inner tube, said wall having a restricted passage, means connecting a source of liquid under pressure to the inlet end of said inner tube, and means cooperating with said outer tube to maintain it in predetermined position in a tubular article being welded.

5. Apparatus of the class described comprising inlet and outlet tubes connected together to form a reversed path of travel for liquid therethru and having inlet and outlet connections, respectively, said outlet tube having an opening thru which particles of metal formed during welding may pass, and means in said outlet tube adjacent to said opening to direct a stream of liquid beneath said opening, and to collect and convey such particles to said outlet connection.

FREDERIC M. DARNER.
WILLIAM A. BLACK.